M. S. ORTON.
Hand-Seeder.
No. 46,928. Patented Mar. 21, 1865.
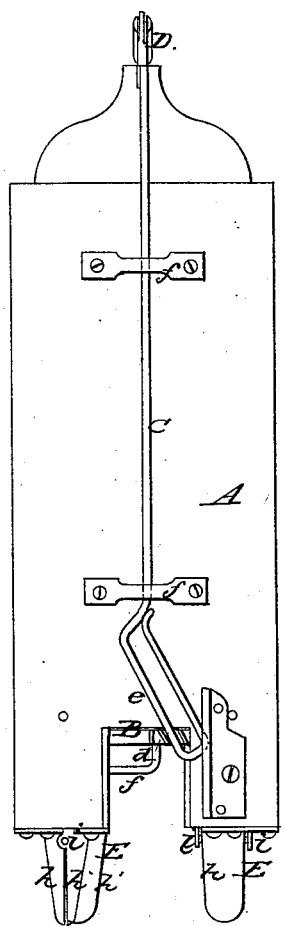
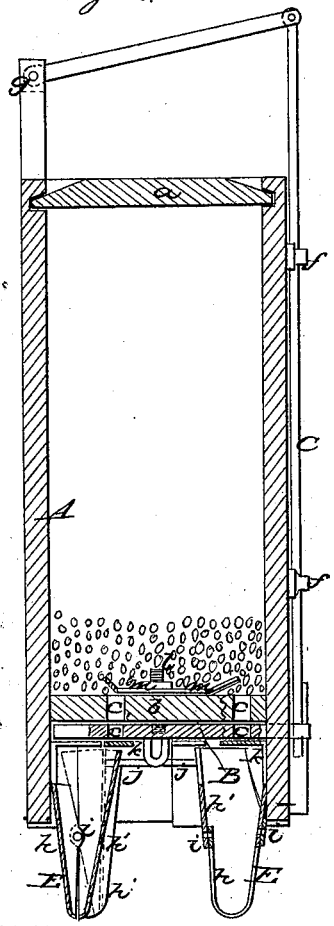
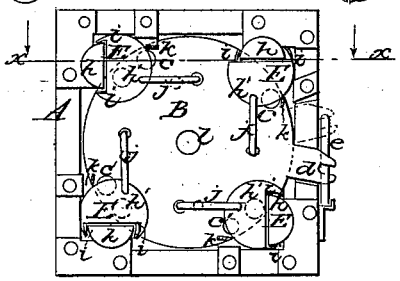
Witnesses.
Inventor:
M. S. Orton
per Munn & Co
attorneys

UNITED STATES PATENT OFFICE.

M. S. ORTON, OF GALESBURG, ILLINOIS.

IMPROVED HAND CORN-PLANTER.

Specification forming part of Letters Patent No. 46,928, dated March 21, 1865.

*To all whom it may concern:*

Be it known that I, M. S. ORTON, of Galesburg, in the county of Knox and State of Illinois, have invented a new and Improved Hand Corn-Planter; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a vertical section of the same; Fig. 3, an inverted plan or bottom view of the same.

Similar letters of reference indicate like parts.

This invention relates to a new and improved machine for planting corn by hand; and it has for its object the planting of the corn in the hill in a scattered state, or with the grains or kernels at a suitable distance apart, and by a means which admits of being operated with facility, or with but little labor, and without the liability of becoming choked or clogged.

A represents a rectangular case or box, which is provided with a sliding top, $a$, to serve as a lid or cover, and has its bottom $b$ perforated with four holes, $c$, at equal distances apart, near its edge.

To the under side of the bottom $b$ there is secured a metal plate, B, of circular form, which is perforated with four holes, $c'$, corresponding in position to the holes $c$ in the bottom $b$. This plate B is provided with a lip or projection, $d$, at its edge, having a slot or groove made in it to receive an inclined rod, $e$, which is at the lower end of a rod, C, the latter working in guides $f$ at one side of the case or box A. The upper end of the rod C is attached to one end of a handle, D, the opposite end of which is connected by a joint, $g$, to the top of the case or box A. By operating the handle D the rod C is raised and lowered, and the plate B turned first in one direction and then in the other, to cause the holes $c'$ of plate B to be thrown in and out of line with the holes $c$ of the bottom $b$ of the case or box A.

E E E E represent four seed-spouts, which are attached to the lower end of the case or box A. These seed-spouts are composed of two parts, $h\ h'$, one part, $h$, being permanently attached to the case or box, and the other part, $h'$, being attached to $h$ by pivots or joints $i$. The upper ends of the parts $h$ are connected by rods $j$ to the plate B, and as the latter is turned by operating the handle D the parts $h'$ of the seed-spouts will be opened and closed—closed when the holes $c'$ of B are in line with the holes $c$ of $b$ and opened when the holes $c'$ are brought in line with or over the spouts E. When the holes $c'$ are in line with the holes $c$ the former are over plates $k$, (broken away in Fig. 3,) which project under the plate B and prevent the escape of seed from the case or box A. The holes $c'$ become filled with seed when they are brought in line with the holes $c$, and when said holes $c'$ are brought in line with spouts E they discharge their seed into the spouts, the latter being open, and in opening forming cavities in the earth to receive the seed. The plate B has a pin, $l$, attached centrally to it, which passes up through the center of the bottom $b$, and has four arms, $m$, attached radially to it. These arms are curved upward at their outer ends, so as not to obstruct the holes $c$, (see Fig. 1,) and they work or turn with the plate B, and serve as agitators to prevent the holes $c$ becoming choked or clogged.

Thus it will be seen that I obtain a corn-planter which may be operated by hand with the greatest facility, and which will plant the corn in a scattered state, or at a suitable distance apart in the hill to favor subsequent growth and cultivation.

I claim as new and desire to secure by Letters Patent—

1. The perforated plate B, operated substantially as shown, in combination with the perforated bottom $b$ of case A, and seed-spouts E, arranged to open and close through the movement of plate B, substantially as and for the purpose set forth.

2. The arms $m$, applied to the pin $l$ of plate B, when used in combination with the spouts E, and all arranged to operate in the manner substantially as and for the purpose specified.

M. S. ORTON.

Witnesses:
A. E. DARLING,
S. B. CHAPMAN.